Patented Feb. 26, 1946

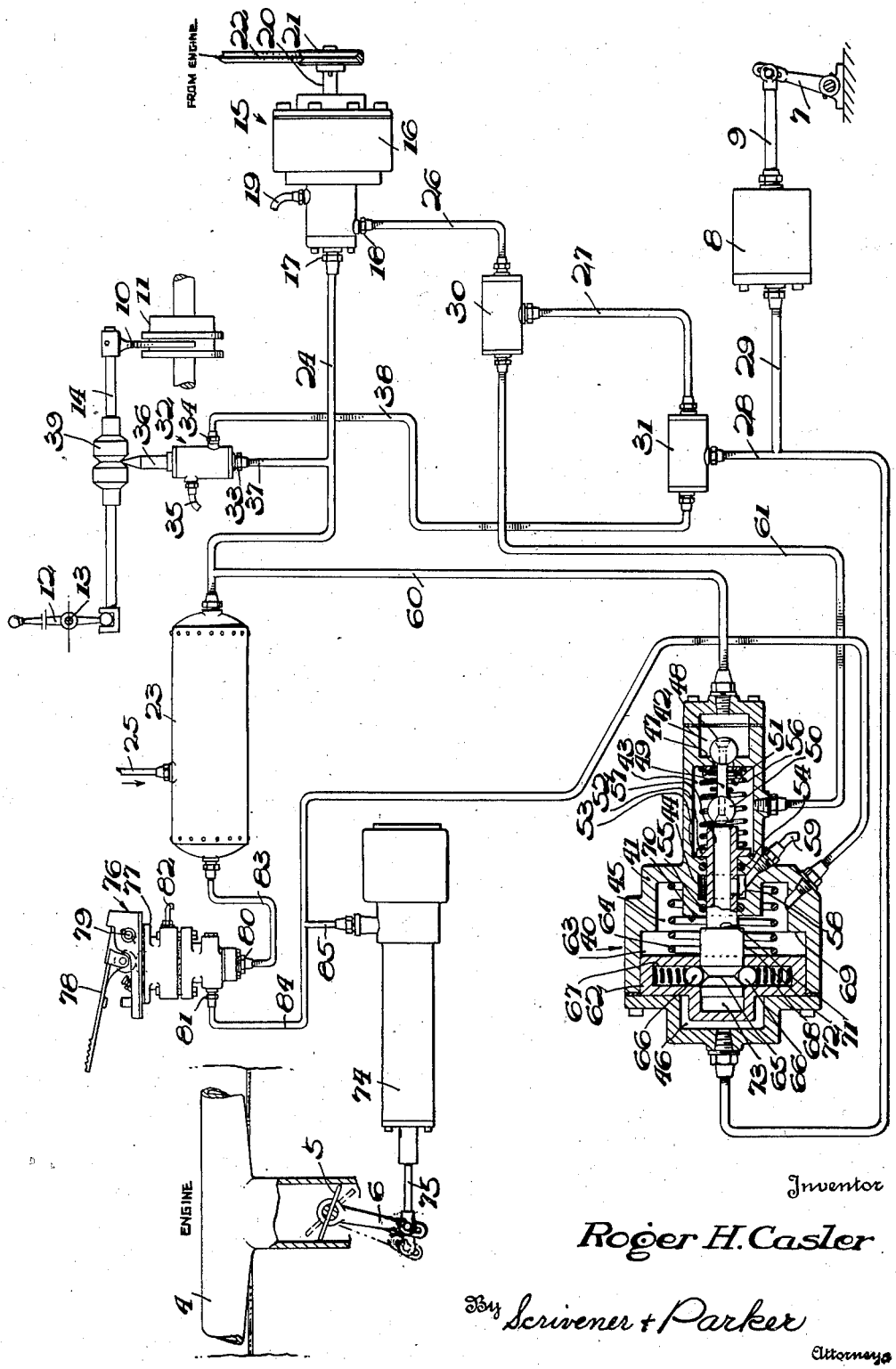

2,395,395

UNITED STATES PATENT OFFICE 2,395,395

FLUID PRESSURE CONTROL MECHANISM

Roger H. Casler, Elyria, Ohio, assignor to Bendix-Westinghouse Automotive Air Brake Company, Elyria, Ohio, a corporation of Delaware Application October 9, 1943, Serial No. 505,689

18 Claims. (Cl. 192—.01)

This invention relates to fluid pressure control mechanism, and more particularly to fluid pressure control mechanism for controlling the clutch of a motor vehicle.

It has previously been proposed to provide means responsive to the speed of the vehicle engine for automatically controlling the engagement and dis-engagement of the vehicle clutch, but difficulty has been experienced in connection with some of the previous systems, in view of the fact that the mechanical friction inherent in the clutch mechanism rendered it difficult to properly adjust the speed responsive valve in such a manner as to control both the engaging and dis-engaging action of the clutch, and it is accordingly an object of the present invention to provide mechanism so constituted as to overcome these difficulties.

A further object of the invention is to provide, in connection with a speed responsive clutch control of the above type, means for minimizing the effect of mechanical friction in the clutch mechanism.

Yet another object of the invention is to provide, in connection with a speed responsive clutch control mechanism of the above type, means for automatically maintaining a predetermined degree of clutch plate dis-engagement when the engine is idling regardless of the mechanical friction in the clutch parts.

A still further object of the invention is to provide fluid pressure control mechanism for controlling the operation of the vehicle clutch in accordance with variations in engine speed, together with automatic valvular means for momentarily supplying pressure to the clutch actuator in excess of that supplied by the speed responsive valve in order to minimize the effects of mechanical friction in the clutch parts and to insure complete clutch disengagement.

These and other objects of the invention will be readily apparent to those skilled in the art when considered in the light of the accompanying drawing and description, but it is to be expressly understood that the description and drawing are employed for purposes of illustration only, and are not intended as a definition of the limits of the invention, reference being had for this purpose to the appended claims.

The single figure of the drawing illustrates, diagrammatically and partially in section, a clutch control mechanism constructed in accordance with the principles of the present invention.

The invention is illustrated in general in connection with a vehicle provided with an engine having an intake manifold 4, a throttle valve 5 and a lever 6 for operating the latter to control the speed of the engine, a clutch controlling member 7 provided with a fluid actuator or motor 8 connected thereto by means of a piston rod 9, and a transmission having a shiftable element 10 adapted on movement to the right or left to move a transmission gear or clutch 11 to engage one or another of a pair of gear ratios, the shiftable element as shown in the drawing occupying its neutral position. A gear shift lever 12 is pivotally mounted on the vehicle by means of a pivot pin 13, and is adapted on movement in either direction about the pivot pin to move the shiftable element by virtue of its connection therewith through the shift rod 14.

As stated heretofore, speed responsive means is provided for controlling the pressure of fluid in the clutch motor in response to variations in the speed of the engine, the speed responsive means in this case taking form of a centrifugal valve mechanism 15 which may be constructed in accordance with the principles set forth in the patent to Roy S. Sanford, No. 2,228,612, dated January 14, 1941. The above valve mechanism is provided with a casing 16 having an inlet connection 17, an outlet connection 18 and an exhaust connection 19, the valve further being provided with a rotatable shaft 20 having a pulley driven by the vehicle engine through the medium of a belt 22. On reference to the above patent, it will be understood that with the engine running at idling speed, the mechanism 15 is effective to prevent communication between connections 18 and 19 and to permit communication between connections 17 and 18 to supply fluid at a predetermined pressure to connection 18, while on an increase in the speed of the vehicle engine, the mechanism is effective to prevent communication between connections 17 and 18 and to permit controlled communication between connections 18 and 19 in order to exhaust fluid pressure from the clutch motor in order to control the engagement of the clutch in accordance with the increase in engine speed. The mechanism 15 is supplied with fluid pressure from a suitable reservoir 23 through a conduit 24 connected with the connection 17, the reservoir being supplied with fluid pressure from a compressor, not shown, through a conduit 25. The outlet connection 18 of the valve mechanism is connected with the motor through a series of conduits 26, 27, 28 and 29, the latter two conduits being interconnected, while the conduits 26 and 27 and the conduits 27 and 28 are adapted for interconnection respectively by means of double check valves 30 and 31. These check valves are both of conventional and identical construction, and it will be understood that on application of fluid pressure to conduit 26, the check valve 30 is effective to establish communication between conduits 26 and 27 and that check valve 31 is effective to connect conduits 27 and 28. Thus with the engine running at idling speed, fluid pressure is supplied from the reservoir 23 to the motor 8 to move the clutch controlling member 7 to clutch dis-engaging position through conduit 24, the valve mechanism 15, conduit 26, double check valve 30, conduit 27, double check valve 31, and conduits 28 and 29, an increase in the engine speed serving to operate the valve mechanism 15 to release fluid pressure from the motor through the exhaust connection 19 of the latter valve in order to provide a controlled clutch engagement.

Since the use of the above speed responsive clutch control valve eliminates the need for the conventional clutch pedal, it is necessary to provide means for automatically dis-engaging the clutch during shifting of the gears in the transmission, and to this end, a valve mechanism 32, controlled by the operation of the shiftable gear changing element, is provided to automatically supply fluid pressure to the clutch motor during the gear shifting operation, this valve being provided with an inlet connection 33, an outlet connection 34 and an exhaust connection 35. This valve is also of well-known construction and is more fully illustrated in the patent to Roy S. Sanford, No. 2,189,679, dated February 6, 1940, and it will be understood on reference to the above patent, that the valve is provided with an operating plunger 36, so arranged that with the plunger in the position shown, the valve is effective to prevent communication between connections 33 and 34 and to permit communication between connections 34 and 35, while on downward movement of the plunger communication is prevented between connections 34 and 35 and is permitted between connections 33 and 34. The valve is supplied with fluid pressure from the reservoir 23 through a conduit 37 connected with the conduit 24, the outlet connection of the valve being connected with the fluid motor by means of a conduit 38, connected with the left end of the double check valve 31, and it will be understood by those skilled in the art that in the event the pressure in the conduit 38 exceeds that in the conduit 27 at any time, the double check valve will be effective to establish communication between conduits 38 and 28 in order to permit the valve mechanism 32 to supply fluid pressure to the clutch motor. In order that the valve 32 may be operative to supply fluid pressure to the motor 8 to effect dis-engagement during gear shifting operation, the upper end of the plunger 36 is in engagement with a cam 39 mounted for movement with the shift rod 14, the cam being so shaped that the plunger 36 is depressed to operate the valve during the gear shifting operation and remains in the position shown whenever the shiftable element and shift rod is in neutral or gear-engaged position, thus providing for automatic dis-engagement of the clutch during the gear shifting operation.

It will be seen from the foregoing that the valve mechanism 32 is effective to supply substantially full reservoir pressure to the clutch motor in order to effect complete dis-engagement of the clutch, while the speed-responsive valve mechanism 15 is effective to supply a reduced pressure to the clutch motor which is just sufficient to substantially dis-engage the clutch plates. Satisfactory operation of this system has been handicapped in the past, however, due to the inherent mechanical friction in the clutch parts, this making it difficult to adjust the pressure delivered by the centrifugal valve to satisfactorily take care of all operating conditions. By way of example, the pressure delivered by the valve 15 may be so adjusted that when the vehicle engine is idling, the plates of the clutch are in slight dragging engagement, and this type of operation is satisfactory providing the clutch is fully dis-engaged by the operation of mechanism such as the valve 32, clutch re-engaging movement of the member 7 being limited in this case by the inherent mechanical friction of the clutch parts so as to prevent sufficient re-engagement of the clutch parts to cause dragging except on release of pressure from the motor by the valve 15. In the event the operator slows the vehicle down to such an extent that the valve 15 supplied its full pressure to the clutch motor, without, at the same time, shifting gears in order to supply a higher pressure to the clutch motor, the clutch will thus drag and interfere with proper control on the part of the operator.

It has been suggested, therefore, that means be provided for momentarily supplying a relatively high pressure to the clutch motor in order to effect complete dis-engagement whenever the clutch is dis-engaged by the action of the speed responsive valve 15, and an automatic valve mechanism 40 is provided for accomplishing this result, this valve being under the control of the pressure in the fluid motor, the pressure supplied by the speed responsive valve and the operation of the accelerator pedal of the vehicle. This valve includes a casing 41 provided with an inlet chamber 42, an outlet chamber 43, an exhaust chamber 44, and a pair of control chambers 45 and 46. The chambers 42 and 43 are separated by means of a ported partition 47, and communication between the chambers through the partition is normally prevented by means of a suitable valve 48 provided with a valve stem 49 and an exhaust valve 50 mounted on the left end of the stem, the valve 48 being normally maintained in the position shown by means of a valve spring 51 interposed between the left side of the partition and the right side of the exhaust valve 50. A valve operating element 52 is slidably mounted in a bore 53 centrally located in the casing between the chambers 43 and 45, leakage between the chambers 42 and 43 and chambers 44 and 45 around the slidable element being prevented by means of suitable sealing elements 54 and 55, the valve operating element being normally maintained in the position shown by means of a spring 56 interposed between the right end of the element and the left side of the partition 47. The element is provided with a centrally located bore 57, the right end of this bore being adapted on movement of the element to the right to contact the left face of the exhaust valve 50 in order to prevent communication between the outlet chamber 43 and the exhaust chamber 44. The bore 57 is in communication with atmosphere by means of a port 58 formed in the wall of the bore and connected with the exhaust chamber 44, the latter chamber being connected with atmosphere by means of a suitable conduit 59. Thus, with the parts in the position shown, communication between the inlet chamber and the outlet chamber is prevented by means of the valve 48, while the outlet chamber is connected with atmosphere through the bore 57, the port 58, the exhaust chamber 44 and the exhaust conduit 59, movement of the element 57 to the right serving to prevent communication between the outlet chamber and atmosphere and to operate the valve 48 to permit communication between the inlet chamber and the outlet chamber. Fluid pressure is supplied to the inlet chamber by means of a conduit 60 connected with the conduit 24 leading to the reservoir, while the outlet chamber is connected to the motor 8 by means of a conduit 61 connected with the left side of the double check valve 30, it being understood that when the pressure in the conduit 61 exceeds that in the conduit 26, the double check valve will be effective to establish a connection between the conduits 61 and 27, and since the connection 27 is connected with the motor 8 through the connections above described, it will be understood that the valve mechanism 40 is effective on movement of the valve operating element 52 to the right to supply fluid pressure from the rservoir to the fluid motor.

As shown in the drawing, the control chambers 45 and 46 are separated by means of a piston 62 slidably mounted in a cylinder 63 formed in the casing, the piston being normally maintained in the position shown against the left end of the casing by means of a spring 64 interposed between the casing and the right side of the piston. The piston 62 is provided for the purpose of actuating the valve operating element 52 and in order that it may be yieldably connected therewith, for reasons to be described hereinafter, detent means is provided for preventing relative movement of the members with respect to each other except when the force tending to cause such relative movement exceeds a predetermined value. To this end, the element 52 is provided with a V-shaped groove 65, this groove being engaged by suitable detent balls 66 slidably mounted in bores 67 formed radially in the piston, the balls being maintained in the position shown by means of springs 68 carried in the bores. Movement of the piston 62 to the right is limited by means of a shoulder 69 formed in the casing, and movement of the valve operating element 52 to the right is preferably, but not necessarily, limited to a lesser travel by means of shoulder 70 formed on the housing and a shoulder 71 formed on the valve operating element, the shoulders being so positioned with relation to each other that on movement of the piston 62 to the right, under the application of a suitable pressure thereon, the shoulder 71 will first engage the shoulder 70 to prevent further movement of the valve operating element, and the piston will thereafter continue to move to the right until such time as the balls 66 have been cammed outwardly from the V-shaped groove sufficiently to permit further movement of the piston to the right against the shoulder 69 without corresponding further movement of the valve operating element, the balls 66 during this part of the operation riding on the outer surface of a cylindrical portion 72 formed on the valve operating element at the right of the groove. Thus it will be apparent that on initial movement of the piston to the right, the piston and the valve operating element will be connected together by the detent mechanism, and that the establishing of a predetermined force on the piston will result in the transmission of a corresponding force on the valve operating element. When the piston is moved sufficiently to cam the balls out of the groove, the balls will ride on the cylindrical surface above mentioned and thereafter the force required to move the valve operating element to the left with respect to the piston will be relatively small in view of the slight friction between the balls and the cylindrical surface. A recess 73 is also provided in the piston at the left end of the valve operating element, and the recess is so dimensioned as to permit the valve operating element to move to the left sufficiently to close the intake valve 48 and open the exhaust valve 50 when the piston is positioned against the shoulder 69.

In the operation of the above described system, it is assumed that the speed responsive valve mechanism 15 is so adjusted as to provide, when the engine is idling, sufficient pressure to the clutch motor 8 to nearly but not entirely disengage the plates of the vehicle clutch, this pressure being supplied through the conduit 26, the double check valve 30, the conduit 27, the double check valve 31 and the conduits 28 and 29. The conduit 28, however, is also connected with the control chamber 46 of the valve mechanism 40, and the spring 64 is so dimensioned with respect to the area of the piston 62, that the pressure supplied to the clutch motor and to the conduit 28 by the centrifugal valve 15 is sufficient to move the piston 62 to the right against the tension of the spring 64 until it engages the shoulder 69. During this operation, the valve operating element 52 is likewise moved to the right by virtue of its limited force transmitting or detent connection with the piston as above described, the element operating to first close the exhaust valve to prevent communication between the outlet chamber 43 and atmosphere and to subsequently open the inlet valve in order to permit communication between the inlet chamber 42 and the outlet chamber 43, and since the inlet chamber is connected with the supply reservoir through conduits 60 and 24, it will be understood that fluid pressure will be supplied to the outlet chamber at the same pressure as that obtaining in the supply reservoir. The outlet chamber is connected with the clutch motor 8 through the conduit 61, the double check valve 30, the conduit 27, the double check valve 31, and conduits 28 and 29, and fluid pressure will therefore be supplied to the clutch motor at reservoir pressure through the above connections in order to insure complete dis-engagement of the clutch plates. In view of the inherent friction in the mechanical parts of the clutch, subsequent release of pressure in the fluid motor to that for which the centrifugal valve is adjusted, will not, however serve to move the clutch control member sufficiently to cause partial re-engagement of the clutch plates, as the mechanical friction will prevent the member from returning to this extent, and it will be consequently understood that as soon as sufficient pressure has been supplied to the motor to fully disengage the clutch plates, this additional pressure supplied by the valve mechanism 40 can be released without resulting in dragging of the clutch plates. This action is readily accomplished by the novel arrangement of the valve mechanism 40, the friction between the detent balls 66 and the cylindrical surface 72, being sufficient to overcome the springs 51 and 56 and to maintain the intake valve 48 in open position during inital operation of the mechanism, but insufficient to maintain the element in the positon to open the intake valve when the pressure in the fluid motor and in the outlet chamber 43 exceeds the pressure delivered by the centrifugal valve by a predetermined value, and when this pressure is reached in the clutch motor, the valve operating element will be moved to the left with respect to the casing 42 and with respect to the piston 62, the latter being maintained in position against the shoulder 69 under the action of the pressure supplied to the chamber 46 through conduits 29 and 28 from the clutch motor. As soon as the vehicle engine speed is increased and the vehicle is traveling along the highway under normal operating conditons, the centrifugal valve will be effective to release the pressure in the clutch motor and consequently in the control chamber 46, whereupon the spring 64 will be effective to return the piston 62 to the position shown in the drawing. When the piston moves to the left, the detent balls 66 will again engage the V-shaped groove 65 and the valve will be reset for any subsequent operation of the above type. Thus the valve is automatically effective to momentarily supply fluid pressure to the motor 8 at a value in excess of or in addition to that supplied by the centrigual valve 15 in order to insure complete clutch dis-engagement, subsequent operation of the control mechanism to engage the clutch serving to reset the valve mechanism, the operation of the valve mechanism 40 being under the control of the pressure in the clutch cylinder through conduits 29 and 28 and the pressure in the outlet chamber 43 when the valve mechanism is effective to supply fluid pressure to the clutch motor.

Although the valve will automatically reset itself as above described, additional means is provided to insure positive resetting of the valve when the vehicle is operating, such means including means for controlling the resetting operation in response to operation of the vehicle accelerator. In the illustrated embodiment of the invention, the throttle lever 6 of the vehicle is actuated by means of a suitable fluid motor 74 connected with the lever by means of a piston rod 75. The supply of fluid pressure to the motor 74 is controlled by means of an operator's control valve 76, which is preferably constructed in accordance with the principles set forth in the patent to William J. Andres and Roy S. Sanford, No. 2,133,275, dated October 18, 1938. This control valve is provided with a casing 77 and an operator's pedal 78 pivotally mounted thereon by means of a pivot pin 79, together with an inlet connection 80, an outlet connection 81, and an exhaust conduit 82. On reference to the above mentioned patent, it will be understood that with the pedal in the position shown, the valve is operative to prevent communication between connections 80 and 81 and to permit communication between connections 81 and 82, depression of the pedal by the operator serving to prevent communication between connections 81 and 82 and to permit communication between connections 80 and 81 to establish a pressure in the connection 81 which is substantially proportional to the degree of depression of the control pedal. The connection 80 receives fluid pressure from the reservoir 23 through a conduit 83, while the outlet connection 81 is connected with the throttle cylinder 74 through the medium of conduits 84 and 85. With the control pedal 78 in the position shown, the throttle valve 5 is maintained in closed position by means of a suitable spring, not shown, incorporated in the motor 74, and on depression of the pedal the throttle valve will be opened in accordance with the degree of movement of the control pedal. Thus when the control pedal is depressed to open the throttle valve and increase the speed of the vehicle engine, the pressure will be increased in the conduit 84, and advantage is taken of this fact to provide for positive resetting of the valve mechanism 40 for a subsequent operation, it being noted that the conduit 84 is connected with the control chamber 45 of the valve mechanism 40. Thus, in the event the piston 62 is in its extreme right position against the shoulder 69 with the valve operating element 52 in its extreme left position in accordance with the mode of operation heretofore described, it will be apparent that on operation of the accelerator pedal to increase the speed of the engine and to increase the speed of the vehicle, fluid pressure will be supplied to the control chamber 45 and will act on the right face of the piston rod to assist the spring in returning the piston to the position shown in the drawing. When the piston is moved to this position, the detent balls 66 will again engage the groove 65 in the valve operating element, and the valve mechanism will be reset or reconditioned for subsequent operation under the control of the fluid pressure supplied to the clutch cylinder to momentarily supply an increased pressure of fluid to the cylinder in order to insure complete clutch dis-engagement regardless of the mechanical friction inherent in the moving parts of the clutch.

Due to the action of the control valve mechanism 40, it is possible to so adjust the output pressure of the centrifugal valve 15 as to cause the motor 8, on application of fluid pressure thereto by the centrifugal valve, to move the clutch control member 7 sufficiently to partially dis-engage the plates of the clutch, complete dis-engagement being insured by the momentary additional supply of fluid pressure supplied to the motor under the control of the valve 40, the mechanical friction of the clutch parts thus serving to actually assist in maintaining the clutch plates in disengagement under this condition of operation, even though the pressure of fluid supplied to the motor by the valve 15 is actually less than that necessary to maintain the plates in this position. With the parts in this condition, it will be understood that any increase in the speed of the engine with a subsequent reduction of pressure in the fluid motor will immediately initiate engagement of the clutch plates, since prior to such operation, the forces holding the clutch in dis-engaged position are the motor force and the frictional force. It will also be noted that the means controlled by the accelerator pedal for resetting the valve 40 serves a further useful purpose when it is noted that operation of the gear shift mechanism 12 serves to supply full reservoir pressure to the clutch motor and consequently to the control chamber 46 of the valve 40 during the gear shifting operation, thus causing operation of the valve 40 to supply fluid pressure to the motor, although during this condition of operation such supply is entirely unnecessary. It is necessary, however, that resetting of the valve mechanism 40 be insured after a gear shifting operation, and the action of the valve 76 in supplying fluid pressure to the control chamber 45 definitely insures such resetting of the valve mechanism.

There has thus been provided by the present invention, in connection with clutch control mechanism of the speed responsive type, means for permitting an accurate and critical setting of the pressure delivered by the speed responsive means, together with means for minimizing or overcoming the detrimental effects of the inherent mechanical friction of the clutch mechanism which would otherwise seriously interfere with satisfactory operation of the clutch when the speed responsive valve is so adjusted.

While the invention has been illustrated and described with considerable particularity, it will be understood that the illustrated embodiment may take other forms as will be readily understood by those skilled in the art. It is to be specifically understood, therefore, that the accompanying drawing and specification are not designed as a definition of the limits of the invention, reference being had for this purpose to the appended claims.

What is claimed is:

1. The combination in a vehicle having an engine, a clutch controlling member, and a power actuator for the member, of means for controlling the application of power to said actuator in accordance with the speed of the engine and in accordance with the application of power to said actuator including an element responsive to engine speed for controlling the application of power to the actuator, and power control means responsive to the power supplied to said actuator under the control of the element, said power control means being operable for applying additional power to the actuator and including means for releasing said additional power from the actuator when said additional power exceeds a predetermined value.

2. The combination in a vehicle having an engine, a clutch controlling member, and a power actuator for the member, of means for controlling the application of power to the actuator in accordance with the speed of the engine and in accordance with the application of power to said actuator including an element responsive to engine speed for controlling the application of power to the actuator, and power control means for applying additional power to the actuator and for releasing said additional power therefrom when said additional power exceeds a predetermined value including a member responsive to the power applied to the actuator by the operation of said speed responsive element and a second member responsive to the power applied to the actuator by the operation of the power control means.

3. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to said actuator and for releasing said additional power therefrom when said additional power exceeds a predetermined value including a member responsive to the power applied to the actuator by the operation of said speed responsive element, a second member responsive to the power supplied to the actuator by the operation of the power control means, and means for permitting relative movement between said last named members when the power applied to the actuator by the operation of the power control means exceeds the power applied thereto by the operation of the speed responsive element by a predetermined value.

4. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to said actuator and for releasing said additional power therefrom when said additional power exceeds a predetermined value including a second member operable in one position to apply additional power to the actuator and in another position to release said additional power from the actuator, a third member responsive to the power applied to the actuator by the operation of said speed responsive element for moving the second member to said one position, means for subjecting the second member to the power applied to the actuator by said power control means, and means connecting said second and third members for permitting movement of the second member to said another position when the power applied to the actuator by the power control means exceeds a predetermined value.

5. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to said actuator and for releasing said additional power therefrom when said additional power exceeds a predetermined value including a second member operable in one position to apply additional power to the actuator and in another position to release said additional power from the actuator, a third member movable in one direction in response to the power applied to the actuator by the operation of the speed responsive element for moving the second member to said one position, means for subjecting the second member to the power applied to the actuator by said power control means, means connecting said second and third members for permitting the movement of said second member to said another position when the power applied to said actuator by the power control means exceeds a predetermined value, and means for moving the third member in the opposite direction when the power applied to the actuator by the operation of the speed responsive element is released.

6. The combination in a vehicle having an engine, an accelerator for controlling the speed of the engine, a clutch controlling member, and a power actuator for the member, of means for controlling the application of power to said actuator in accordance with the speed of the engine, the application of power to said actuator, and the operation of said accelerator including an element responsive to engine speed for controlling the application of power to the actuator, and power controlling means for applying additional power to the actuator and releasing said power therefrom including a second member movable for applying and releasing power to and from the actuator, a third member having a limited force transmitting connection with the second member and movable in one direction in response to the application of power to the actuator by the operation of the speed responsive element to move the second element to supply additional power to the actuator, and means responsive to the operation of the accelerator to increase the speed of the engine for moving the third member in the opposite direction.

7. The combination in a vehicle having an engine, an accelerator for controlling the speed of the engine, a clutch controlling member, and a power actuator for the member, of means for controlling the application of power to said actuator in accordance with the speed of the engine, the application of power to said actuator, and the operation of said accelerator including an element responsive to engine speed for controlling the application of power to the actuator, and power controlling means for applying additional power to the actuator and releasing said power therefrom including a second member movable for applying and releasing power to and from the actuator, a third member having a limited force transmitting connection with the second member and movable in one direction in response to the application of power to the actuator by the operation of the speed responsive element to move the second element to supply additional power to the actuator, means responsive to operation of the accelerator to increase the speed of the engine for moving the third member in the opposite direction, and means for subjecting the second member to the power applied to said actuator by the power controlling means for moving said second member in said opposite direction.

8. The combination in a vehicle having an engine, an accelerator for controlling the speed of the engine, a clutch controlling member, a power actuator for the clutch controlling member, a transmission, and a shiftable element movable to establish desired transmission gear ratios, of means for controlling the application of power to said actuator in accordance with the speed of the engine, the application of power to said actuator, the operation of said accelerator, and the operation of said shiftable element, including an element responsive to engine speed for controlling the application of power to said actuator, means controlled by said shiftable element for supplying power to the actuator during gear shifting movement of said element, and power controlling means for applying power to said actuator in addition to the power applied thereto by the operation of said speed responsive element and for releasing said additional power therefrom including a second member movable for applying and releasing power to and from said actuator, a third member having a limited force transmitting connection with the second member and movable in one direction in response to the application of power to the actuator by the speed responsive element to move the second element to supply additional power to the actuator, means responsive to operation of the accelerator to increase the speed of the engine for moving the third member in the opposite direction, and means for subjecting the second member to the power applied to said actuator by the power controlling means for moving the second member in said opposite direction.

9. The combination in a vehicle having an engine, a clutch controlling member, and a fluid actuator for the member, of means for controlling the supply of fluid pressure to the actuator in accordance with the speed of the engine and the pressure of fluid in the actuator including a valve responsive to the speed of the engine for supplying fluid to the actuator at a predetermined pressure when the engine is idling, and valvular means including a member responsive to the pressure of fluid supplied to the actuator by the speed responsive valve and a valve operating element having a limited force transmitting connection with the second named member for momentarily increasing the pressure of fluid in said actuator.

10. The combination in a vehicle having an engine, a clutch controlling member, and a fluid actuator for the member, of means for controlling the supply of fluid pressure to the actuator in accordance with the speed of the engine and the pressure of fluid in the actuator including a valve responsive to the speed of the engine for supplying fluid to the actuator at a predetermined pressure when the engine is idling, and valvular means for momentarily supplying fluid to the actuator at a pressure higher than said predetermined pressure including a second member responsive to the pressure in the actuator and a third member having a limited force transmitting connection with the second member and responsive to the pressure of fluid supplied to the actuator by the valvular means.

11. The combination in a vehicle having an engine, a clutch controlling member, and a fluid actuator for the member, of means for controlling the supply of fluid pressure to the actuator in accordance with the speed of the engine and the pressure of fluid in the actuator including a valve responsive to the speed of the engine for supplying fluid to the actuator at a predetermined pressure when the engine is idling, and valvular means for momentarily supplying fluid to the actuator at a pressure higher than said predetermined pressure including a second member movable in one direction in response to the pressure of fluid in the actuator, resilient means for opposing said movement, a third member having a limited force transmitting connection with the second member and adapted for movement with the latter in said one direction, and means for subjecting said third member to the pressure of fluid supplied to the actuator by the valvular means for moving the third member in the opposite direction to release the fluid supplied to the actuator by the action of the valvular means.

12. The combination in a vehicle having an engine, a clutch controlling member, and a fluid actuator for the member, of means responsive to the speed of the engine for supplying fluid pressure to the actuator at a predetermined pressure when the engine is idling, and valvular means operable for establishing a higher predetermined pressure in the actuator and for re-establishing the first named predetermined pressure when the higher pressure is established including a valve operating element subjected to the higher predetermined pressure, a member for operating said element subjected to the pressure in the actuator, and a limited force transmitting connection between said last named member and element.

13. The combination in a vehicle having an engine, a clutch controlling member, and a fluid actuator for the member, of means responsive to the speed of the engine for supplying fluid to the actuator at a predetermined pressure when the engine is idling and for exhausting fluid pressure therefrom in accordance with increases in engine speed, valvular means responsive to the pressure in the actuator for automatically supplying additional fluid to establish a higher predetermined pressure in the actuator after establishment of the first named predetermined pressure and for re-establishing the first named pressure after the second named pressure is established, and valvular means for preventing the exhaust of fluid from the actuator by the operation of said speed-responsive means when the pressure of fluid in the actuator exceeds the first named pressure.

14. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to the actuator and for releasing said additional power therefrom including a power control element movable for applying and releasing power to and from the actuator, a member responsive to the power applied to said actuator by the operation of the speed responsive element for moving said power control element to apply power to the actuator, and means including a detent for connecting the power control element and power responsive member for permitting relative movement between said element and member when the force exerted by the latter to move the former exceeds a predetermined value.

15. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to the actuator and for releasing said additional power therefrom including a power control element movable for applying and releasing power to and from the actuator, a member responsive to the power applied to said actuator by the operation of the speed responsive element for moving said power control element to apply power to the actuator, and latch means for normally connecting said element and member and releasable on the application of a predetermined force to the power control element by the power responsive member.

16. The combination in a vehicle having an engine, a clutch controlling member, and a power actuator for the member, of means for controlling the application of power to the actuator in accordance with the speed of the engine and in accordance with the application of power to the actuator including an element responsive to engine speed for controlling the application of power to the actuator, and power control means for applying additional power to the actuator and for releasing said additional power therefrom including a power control element movable for applying and releasing power to and from the actuator, a member responsive to the power applied to said actuator by the operation of the speed responsive element for moving said power control element to apply power to the actuator, and means including a latch for normally connecting said power control element and power responsive member and opposing relative movement therebetween with a predetermined force and operable on application of a greater force to said member for moving the element to oppose said relative movement with a force less than said predetermined force.

17. The combination with a fluid actuator and a control valve operable for establishing a predetermined pressure in the actuator, of valve means controlled by the pressure in said actuator for establishing a higher pressure in the actuator and for reestablishing said predetermined pressure including a valve, a valve operating element responsive to the pressure delivered by the valve means, a member responsive to the pressure in the actuator for operating the element, and limited force transmitting means for connecting the element and member for normally preventing relative movement therebetween and for permitting movement of the element relative to the member when the force exerted by the member to move the element exceeds a predetermined value.

18. The combination with a fluid actuator and a control valve operable for establishing a predetermined pressure in the actuator, of valve means controlled by the pressure in said actuator for establishing a higher pressure in the actuator and for reestablishing said predetermined pressure including a valve, a valve operating element responsive to the pressure delivered by the valve means, a member responsive to the pressure in the actuator for operating the element, limited force transmitting means for connecting the element and member for normally preventing relative movement therebetween and for permitting said relative movement when the forces acting on said element and member tending to cause said relative movement exceed a predetermined value, and means associated with the element for insuring said relative movement.

ROGER H. CASLER.